April 3, 1956 — I. ELLIOTT — 2,740,362
METHOD AND APPARATUS FOR DIVIDING AND PANNING BREAD DOUGH
Filed Sept. 6, 1952 — 3 Sheets-Sheet 1
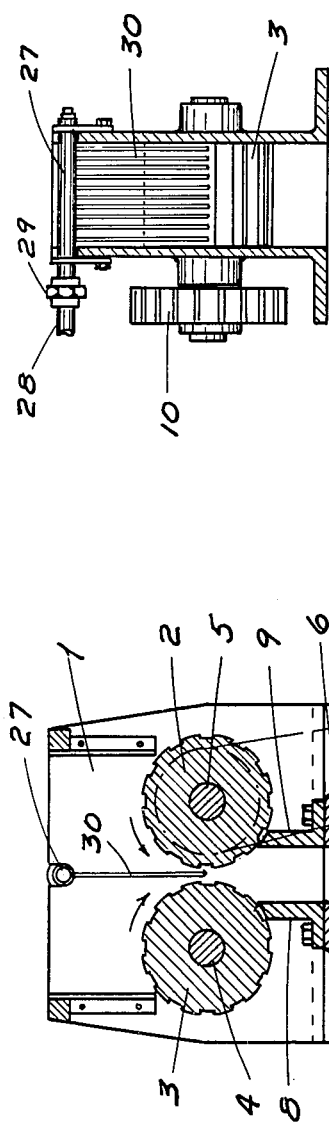
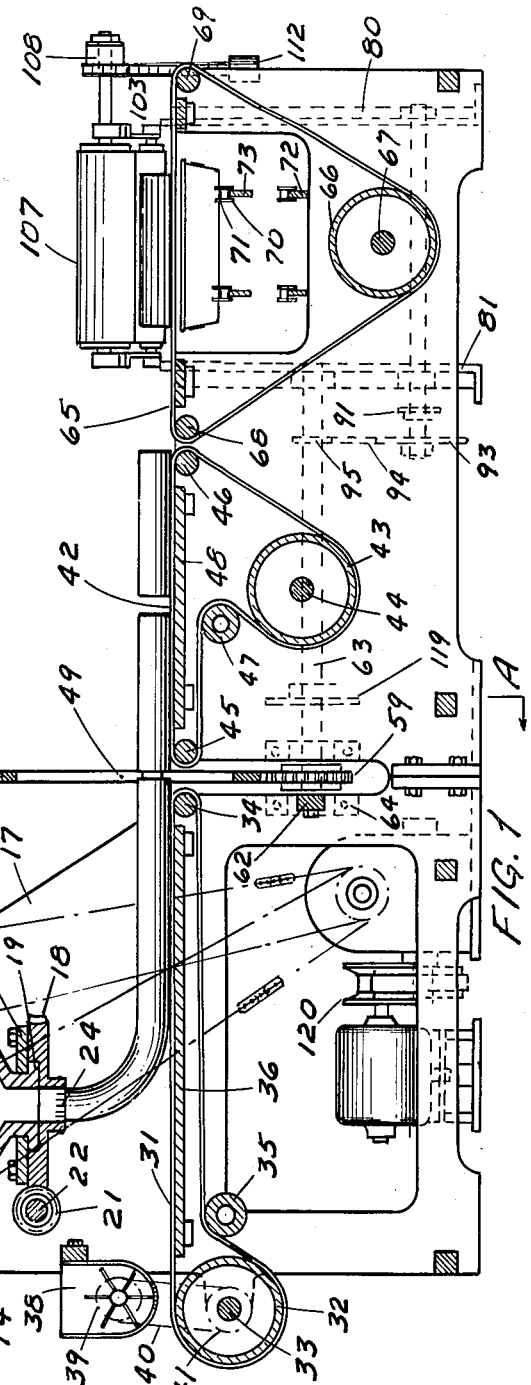
INVENTOR.
Irwin Elliott

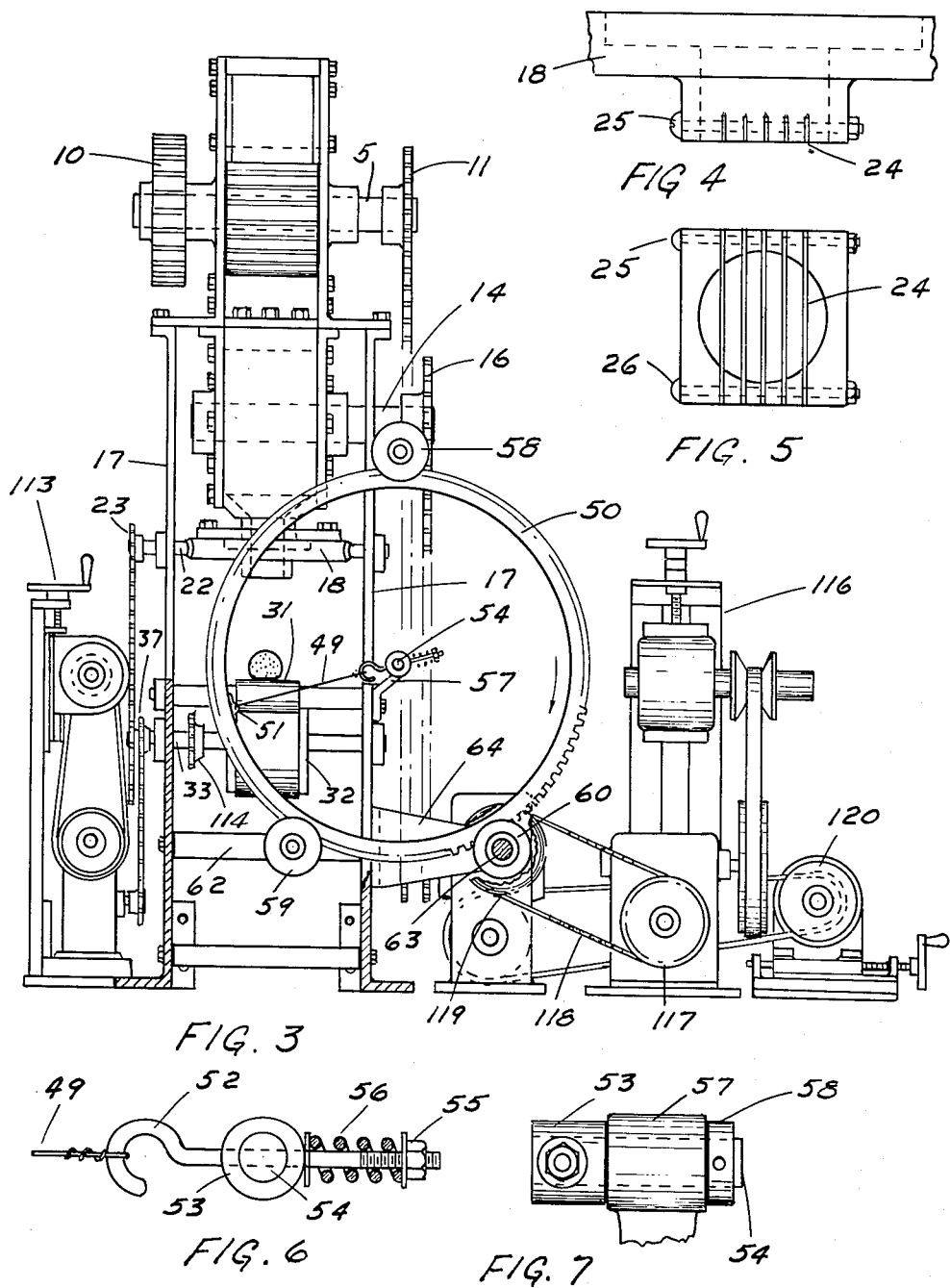

April 3, 1956   I. ELLIOTT   2,740,362
METHOD AND APPARATUS FOR DIVIDING AND PANNING BREAD DOUGH
Filed Sept. 6, 1952   3 Sheets-Sheet 3
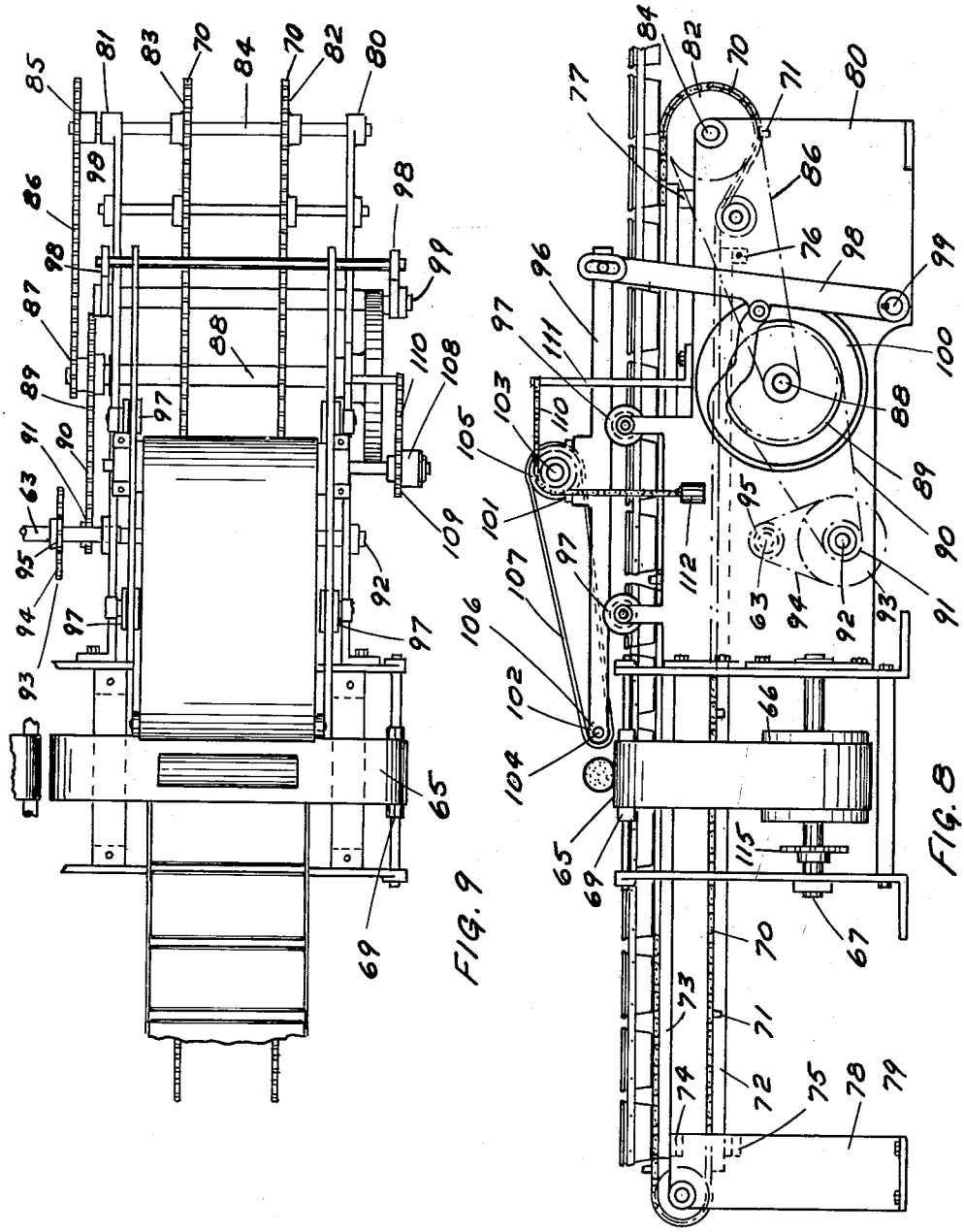
Irwin Elliott INVENTOR.

United States Patent Office 2,740,362
Patented Apr. 3, 1956

2,740,362
METHOD AND APPARATUS FOR DIVIDING AND PANNING BREAD DOUGH

Irwin Elliott, Croton-on-Hudson, N. Y., assignor of one-half to Albert S. Schmidt, Harrisburg, Pa.

Application September 6, 1952, Serial No. 308,232

10 Claims. (Cl. 107—4)

This invention relates to novel and improved apparatus for dividing and panning bread dough.

In conventional bread production the dough is divided, rounded, proofed, moulded and panned.

These operations require considerable machinery, space and time and it is desirable to eliminate any of the above steps.

These steps were evolved as automatic machinery was developed for bread production.

It was found that the machine which divided the dough would also remove the gases of fermentation and it was therefore necessary to permit the dough to recover before proceeding with the next step.

In order that the dough pieces be in condition for handling during the recovery period the rounder was invented; this machine merely rounds up the dough pieces and coats them with flour to permit ease of handling.

After this recovery period of ten to fifteen minutes the dough pieces are moulded into a shape to fit the pan.

With my apparatus I eliminate the rounding, proofing and moulding operations.

I do so by conditioning or treating the dough in the dividing apparatus in such a manner that the recovery period is unnecessary and the dough may be placed directly into the baking pan.

This treatment consists of an infusion into the dough of a solution containing an oxidizing agent or yeast food which acts during the proofing time in the pan to increase the generation of fermentation gases and thus aerate the dough to desired volume.

Various agents may be used, such as a mixture of bromate and sodium metavanadate. This mixture is described in a Patent No. 2,095,992 granted C. H. MacIntosh on October 19, 1937 and has been marketed as a bread improver.

Sodium chlorite is also a strong oxidizing agent which may be used for the purpose in the form of an aqueous solution.

For specialty breads such as whole wheat it is desirable to introduce carbon dioxide in the form of carbonated water. One of the problems in production of whole wheat bread is that of fermentation time, which is critical. If extended past a certain point diastasis can proceed to a serious extent but when carbon dioxide is introduced fermentation time may be reduced to within safe limits.

With the use of special prepared white flour, to which a yeast food has been added, the infusion of carbon dioxide alone will result in a loaf of standard volume.

In my apparatus one of the important features is the means for metering the dough and the liquid infusion so that the mixture is held to proper proportions. This is accomplished by use of feed rollers for the dough and by means of a high pressure metering pump for the liquid. This pump is the same as used in homogenizing and spray drying processes.

The space between the feed rollers through which the dough is sheeted and the speed at which the rollers are rotated control the quantity of dough within practical limits.

Another important feature is the means for dispersing the infused liquid uniformly throughout the dough.

For best results a rather slack dough is used and approximately ten per cent of the water to be used in the mix is retained and mixed separately with the oxidizing agent or with carbon dioxide. The term "slack dough" refers to the relative stiffness of the dough and is controlled by the amount of water used. Bread dough consists of flour, salt, yeast, sugar or malt, yeast food, milk, shortening, bleach, conditioner, softener, and water. With a good grade of flour approximately 62–65 lbs. of water may be added for every 100 lbs. of flour to make the usual bread dough. To make a slack dough more than 65 lbs. of water would be added, such as for example 68–70 lbs.

The object of my invention is the elimination of the intermediate proof or recovery period and consequently the equipment required for same.

The invention will be best understood from the following description and annexed drawings in which:

Fig. 1 is a longitudinal sectional elevation of the entire apparatus.

Fig. 2 is a cross section of the hopper showing the tubes through which the oxidizing solution or carbonated water flows into the dough stream between the feed rollers, the nozzles on said tubes being omitted in this view.

Fig. 3 is a cross section on line A–A of Fig. 1 showing the wire cutter and general arrangement of driving units.

Fig. 4 is an enlarged side view of the dough discharge orifice showing the cross blades which cause rotation of the extruded dough cylinder.

Fig. 5 is a detailed bottom plan view of the hub of the worm gear.

Fig. 6 is an enlarged view of the cutting wire tightening device.

Fig. 7 is a projected view of Fig. 6.

Fig. 8 is an end elevation showing the means for feeding pans and the mechanism for rolling the dough pieces into the pans.

Fig. 9 is a projected plan view of Fig. 8.

Referring to Fig. 1 it will be seen that I provide a hopper 1 to receive the dough and grooved feed rollers 2 and 3 mounted on shafts 4 and 5 which force the dough into upper chamber 6 of gear pump 7.

Scrapers 8 and 9 are closely fitted to the periphery of feed rollers 2 and 3.

Feed rollers 2 and 3 are geared together by a pair of gears 10 shown in Figs. 2 and 3 and driven by sprocket 11 mounted on the outside end of shaft 5. Sprocket 11 is shown in Fig. 3.

Gears 12 and 13 of gear pump 7 are mounted on shafts 14 and 15.

Shaft 14 extends from the casing and is driven by sprocket 16 shown in Fig. 3.

Frame 17 serves as a support for the above parts.

The discharge nozzle from gear pump 7 consists of a worm gear 18 which is provided with a central opening in the hub through which the dough is extruded. Gear 18 is counterbored to fit flange 19 of pump body 7. Split collar 20 is bolted to the gear 18 and thus supports the gear in position to rotate.

Worm 21 mounted on shaft 22 rotates gear 18. Shaft 22 is driven by sprocket 23 shown in Fig. 3.

Fig. 4 is an enlarged view of a section of gear 18 showing the discharge opening through the hub.

This hub is slotted to receive blades or knives 24 which consist of metal blades sharpened on the edge which meets the dough flow.

Blades 24 are provided with holes at each end so that they may be held securely in place by means of bolts 25 and 26 shown in Figs. 4 and 5.

Pipe 27 extends across hopper 1 and is connected to pipe 28 by union 29.

Pipe 28 extends to a high pressure metering pump of conventional design.

Tubes 30 are welded into pipe 27 and extended downward between feed rollers 2 and 3. At the discharge ends tubes 30 are provided with nozzles (not shown).

Referring to Fig. 1 it will be seen that the extruded cylinder of dough is first carried on belt 31 which is driven by pulley 32 mounted on shaft 33.

Belt 31 is extended at the delivery end by pulley 34 and returns over idler pulley 35. Belt 31 is supported on plate 36.

Shaft 33 is driven by sprocket 37 shown in Fig. 3 from a variable speed drive unit 113, as hereinafter described.

In order to prevent the dough from sticking, flour duster 38 is provided, which coats belt 31 with flour. Duster 38 is of conventional design and is driven by sprocket 39, chain 40 and sprocket 41 mounted on pulley shaft 33.

From belt 31 the dough cylinder is transferred to belt 42 which is driven at a higher speed than belt 31.

Belt 42 is driven by pulley 43 mounted on shaft 44. Pulleys 45 and 46 extend the belt at each end. Idler pulley 47 maintains belt 42 in contact with pulley 43. Plate 48 supports belt 42.

As the dough cylinder passes from belt 31 to belt 42 it is cut in sections by wire 49 which is mounted in ring gear 50 located in a slot in one side wall of frame 17.

Wire 49 is clamped to the inside of ring gear 50 by clamp 51, and is pulled taut by threaded hook bolt 52 which extends through collar 53 and shaft 54. Nut 55, bearing on spring 56 maintains tension of wire 49.

Shaft 54 revolves in bearing bracket 57 which is mounted on main frame 17.

Ring gear 50 is positioned concentric with shaft 54 by flanged gears 58, 59 and 60. Flanged gear 58 is mounted on bracket 61, flanged gear 59 is mounted on cross stretcher 62 and flanged gear 60 is mounted on drive shaft 63 which revolves in bearing bracket 64 at this end.

The divided dough pieces pass from belt 42 to belt 65 which travels at a greater speed in order to separate the dough pieces.

Belt 65 is driven by pulley 66 mounted on shaft 67 and is extended at one end by pulley 68 and at the other end by pulley 69.

Referring now to Figs. 8 and 9 it will be seen that the pans travel at an angle of 90° to belt 65 beneath its upper run.

The pans are carried on conveyor chains 70 which are equipped with attachments 71.

Chains 70 are supported on tracks 72 and 73 which tracks are supported by cross stretchers 74 and 75 at the discharge end and by cross stretchers 76 and 77 at the feed end.

Cross stretchers 74 and 75 are mounted between outboard frames 78 and 79. Cross stretchers 76 and 77 are mounted between frames 80 and 81.

Chains 70 are driven by sprockets 82 and 83 which are mounted on shaft 84. Shaft 84 rotates in bearing bosses on frames 80 and 81.

Sprocket 85 is mounted on shaft 84 and is driven by means of chain 86 and sprocket 87.

Sprocket 87 is mounted on shaft 88 which is driven by sprocket 89, chain 90 and sprocket 91.

Sprocket 91 is mounted on a counter-shaft 92 which is driven by means of sprocket 93, chain 94 and sprocket 95.

Sprocket 95 is mounted on shaft 63 which extends between bearing bracket 64 and frame 81.

Shaft 63 as previously described also drives the ring gear 50 which carries the cutting wire 49.

A reciprocating carriage 96 is located over the pans. Carriage 96 rides on flanged rollers 97 which rollers rotate on studs mounted on frames 80 and 81.

The reciprocating motion is imparted to carriage 96 through levers 98 arranged at each side and connected together by rocker shaft 99.

Cam 100 which is mounted on shaft 88 imparts the motion to levers 98 in a conventional manner through engagement of its cam track with a cam follower on one of said levers.

Carriage 96 is provided with bearings 101 and 102, shafts 103 and 104 and pulleys 105 and 106.

Belt 107 is driven by pulley 105 and extended by pulley 106.

At the outside end shaft 103 is provided with a freewheeling ball clutch 108 to which sprocket 109 has been fixed.

Chain 110 is anchored to post 111 and engages sprocket 109.

Chain 110 is provided with weight 112 which keeps it taut over sprocket 109.

As carriage 96 moves from right to left shaft 103 and pulley 105 are rotated by engagement of clutch 108 thus imparting motion to belt 107 which acts to roll the dough piece from belt 65 into the pan.

On the return movement of carriage 96 the clutch 108 is disengaged and no motion is imparted to belt 107.

By operating in this manner belt 107 presents a different surface to the dough piece at each movement thus giving it a full cycle of belt length to dry after each contact with a dough piece.

In order to synchronize the operations and to control the weight and length of the divided dough pieces three variable speed drive units are provided.

Each unit consists of a motor, variable speed motor pulley and worm gear reducer. As these units are of regular commercial manufacture I will not numerically indicate the various parts but simply refer to the complete unit by number.

Referring to Fig. 3 it will be seen that variable speed unit 113 drives a sprocket chain running over sprocket 37 on pulley shaft 33. Sprocket 114 on shaft 33 drives a sprocket chain running over a pulley (not shown) on shaft 44 which in turn drives pulley shaft 67 by means of a sprocket chain driving sprocket 115.

Thus the movements of the three belts 31, 42 and 65 are controlled by variable speed unit 113.

Again referring to Fig. 3 it will be seen that variable speed unit 116, by means of sprocket 117, chain 118 and sprocket 119 drives shaft 63. Sprocket 119 is shown partly cut away in Fig. 3.

Shaft 63, as previously described, drives ring gear 50 and by intermediate sprockets and chains also drives pan feeding sprockets 70 and cam 100.

Thus the cutting of the dough pieces, the feeding of the pans and the reciprocating motion of carriage 96 are synchronized and controlled as to speed by variable speed unit 116.

Dough feed rollers 2 and 3 and gear pump 7 are driven by variable speed unit 120. For this purpose sprockets 11 and 16 are driven by the sprocket chains shown somewhat diagrammatically and partially in phantom in Fig. 3.

Once established, the relative speed of the feed rollers and gear pump remain constant.

In operation let us assume that fifty loaves per minute are required.

Variable speed unit 116 is regulated to revolve the ring gear at a rate of fifty revolutions per minute.

This results in fifty cuts per minute, the feeding of fifty pans per minute and the reciprocation of carriage 96 at fifty strokes per minute.

Let us further assume that fifty loaves are to weigh sixty pounds.

The variable speed unit 120 is regulated to revolve the feed rollers 2 and 3 and the gear pump 7 at a speed which will extrude 60 pounds of dough per minute.

It has previously been established that an orifice diameter of say, one and one half inches is proper for extruding this particular loaf in order to obtain the proper length of dough piece to suit the pan, which we will assume is nine inches wide.

Variable speed unit 113 is now regulated so that belt 31 moves at a speed of about thirty-three feet per minute. This will result in dough pieces about 8" in length which is a suitable length for a nine inch pan.

Referring now to the general operation of the apparatus it will be observed that with the proper relation of speeds between the feed rollers 2 and 3 and the gear pump 7 the dough will be under pressure in chamber 6 between the feed rollers and the gears.

After being sheeted between the feed rollers and infused with liquid from tubes 30 the dough is pressed into a mass in this chamber.

This action tends to mix in the liquid.

When the dough enters the gear pump it is broken up in small sections between the gear teeth and then combined again in the lower chamber.

This process of breaking up the dough in this manner and again combining it has a mixing action.

As the dough is forced out of the discharge orifice the vanes extend the gas bubbles longitudinally which is desirable in the finished texture of the baked loaf.

By revolving the discharge orifice while the dough is being extruded further mixing action and extension of the gas bubbles takes place. The dough cylinder is also tightened up by this revolving action.

The extruded dough cylinder is soft and sticky and extremely difficult to cut by ordinary means.

The mechanism which I have devised is successful because the wire passes through the dough with great rapidity and being only fifteen thousandths of an inch in diameter fails to pick up dough in a quantity which can interfere with cutting action.

While I have shown the invention as embodied in specific form, it is understood that various changes in details may be made without departing from the scope of the invention, as defined by the appended claims.

I claim:

1. In apparatus of the character described, the combination of feed rollers for sheeting the dough, injection means for infusing a fluid into the dough disposed between the feed rollers, extrusion means including an orifice disposed to discharge the dough, a pump disposed between the feed rollers and extrusion means, at least one blade disposed within said orifice, means for conveying the dough, a revolving ring through which the dough passes, a wire disposed within said ring for dividing the dough and means for depositing the dough pieces into pans.

2. In apparatus of the character described, the combination of feed rollers for the dough, one or more injectors disposed between the feed rollers, a gear pump to receive the dough from the feed rollers, an orifice disposed to discharge the dough, conveying belt means for conveying the extruded dough, a revolving ring through which the dough passes, a wire disposed within said ring to divide the dough and a reciprocating moving belt for rolling the divided dough pieces from the conveying belt means.

3. In a method of treating dough, the steps comprising sheeting the dough, infusing the sheeted dough with a fluid capable of increasing the generation of fermentation gases, compressing the fluid-infused dough into a first zone without loss of the fluid, dividing the compressed dough into discrete sections without loss of the fluid, compressing the discrete sections into a second zone to mix the infused fluid and dough into a homogeneous mass, extruding the resultant homogeneous mass from said second zone to form a continuous, elongated member of treated dough, and temporarily dividing said member longitudinally during the extruding step and just prior to final extrusion as an undivided continuous elongated member to extend the fluid longitudinally of said member.

4. In a method of treating dough, the steps comprising sheeting the dough, infusing the sheeted dough with a fluid capable of increasing the generation of fermentation gases, compressing the fluid-infused dough into a first zone without loss of the fluid, dividing the compressed dough into discrete sections without loss of the fluid, compressing the discrete sections into a second zone to mix the infused fluid and dough into a homogeneous mass, extruding the resultant homogeneous mass from said second zone to form a continuous, elongated member of treated dough, and twisting said member upon extrusion to insure consolidation thereof and to cause extension of said fluid in said member.

5. In a method of treating dough, the steps comprising sheeting the dough, infusing the sheeted dough with a fluid capable of increasing the generation of fermentation gases, compressing the fluid-infused dough into a first zone without loss of the fluid, dividing the compressed dough into discrete sections without loss of the fluid, compressing the discrete sections into a second zone to mix the infused fluid and dough into a homogeneous mass, extruding the resultant homogenous mass from said second zone to form a continuous, elongated member of treated dough, temporarily dividing said member longitudinally during the extruding step and just prior to final extrusion as an undivided continuous elongated member to extend the fluid longitudinally of said member, and twisting said member upon extrusion to insure consolidation thereof and to cause further extension of said fluid in said member.

6. In a method of treating dough, the steps comprising sheeting the dough, infusing the sheeted dough with a fluid capable of increasing the generation of fermentation gases, compressing the fluid-infused dough into a first zone without loss of the fluid, dividing the compressed dough into discrete sections without loss of the fluid, compressing the discrete sections into a second zone to mix the infused fluid and dough into a homogeneous mass, extruding the resultant homogeneous mass from said second zone to form a continuous, elongated member of treated dough, temporarily dividing said member longitudinally during the extruding step and just prior to final extrusion as an undivided continuous elongated member to extend the fluid longitudinally of said member, twisting said member upon extrusion to insure consolidation thereof and to cause further extension of said fluid in said member, cutting the dough member into predetermined lengths, and depositing the dough pieces into pans.

7. In an apparatus of the character described for treating dough, a first chamber, feed rollers positioned upstream of said first chamber for sheeting the dough and compressing it into the first chamber, injection means positioned at said feed rollers for infusing a fluid into the dough when in the sheeted form, a second chamber, a gear pump positioned between said first and second chambers for dividing the compressed dough into discrete sections and compressing it into said second chamber, extrusion means at the downstream end of said second chamber for extruding an elongated undivided dough member, and vanes in said extrusion means for temporarily longitudinally dividing the dough member during passage thereover.

8. In an apparatus in accordance with claim 7 and including means for rotating said extrusion means to tighten and condense said dough member.

9. In an apparatus of the character described for treating dough, a first chamber, feed rollers positioned upstream of said first chamber for sheeting the dough and compressing it into the first chamber, injection means positioned at said feed rollers for infusing a fluid into the dough when in the sheeted form, a second chamber, a gear pump positioned between said first and second chambers for dividing the compressed dough into discrete sections and compressing it into said second chamber, extrusion means at the downstream end of said second chamber for extruding a dough member, and means for rotating said extrusion means to tighten and condense said dough member.

10. In an apparatus of the character described, the combination of means for extruding dough having an extrusion orifice, a series of spaced vanes of thin cross section disposed across said orifice for temporarily dividing the dough during passage thereover, and means for rotating said spaced vanes to cause tightening of the extruded dough.

References Cited in the file of this patent

UNITED STATES PATENTS

| Number | Name | Date |
|---|---|---|
| 527,579 | Althans et al. | Oct. 16, 1894 |
| 661,999 | Kessler | Nov. 20, 1900 |
| 738,243 | Romero et al. | Sept. 8, 1903 |
| 1,004,406 | Frost | Sept. 26, 1911 |
| 1,143,413 | Lunt | June 15, 1915 |
| 1,382,926 | Mitchell | June 28, 1921 |
| 1,696,891 | Crosland | Dec. 25, 1928 |
| 2,183,693 | Rasch | Dec. 19, 1939 |
| 2,223,079 | Surico | Nov. 26, 1940 |
| 2,298,644 | Hummel | Oct. 13, 1942 |
| 2,463,112 | Kipnis | Mar. 1, 1949 |
| 2,472,073 | Haecks | June 7, 1949 |
| 2,547,566 | Cohoe | Apr. 3, 1951 |
| 2,603,170 | Meakin | July 15, 1952 |
| 2,620,753 | Morrison et al. | Dec. 9, 1952 |